Figure 1:
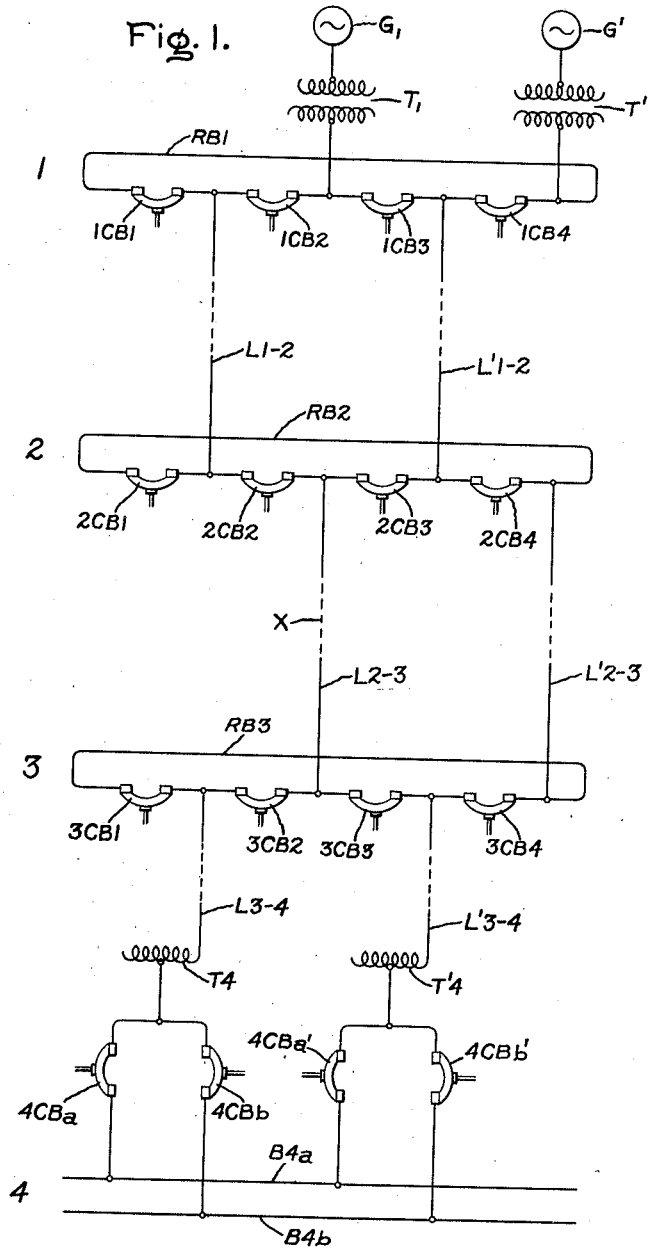

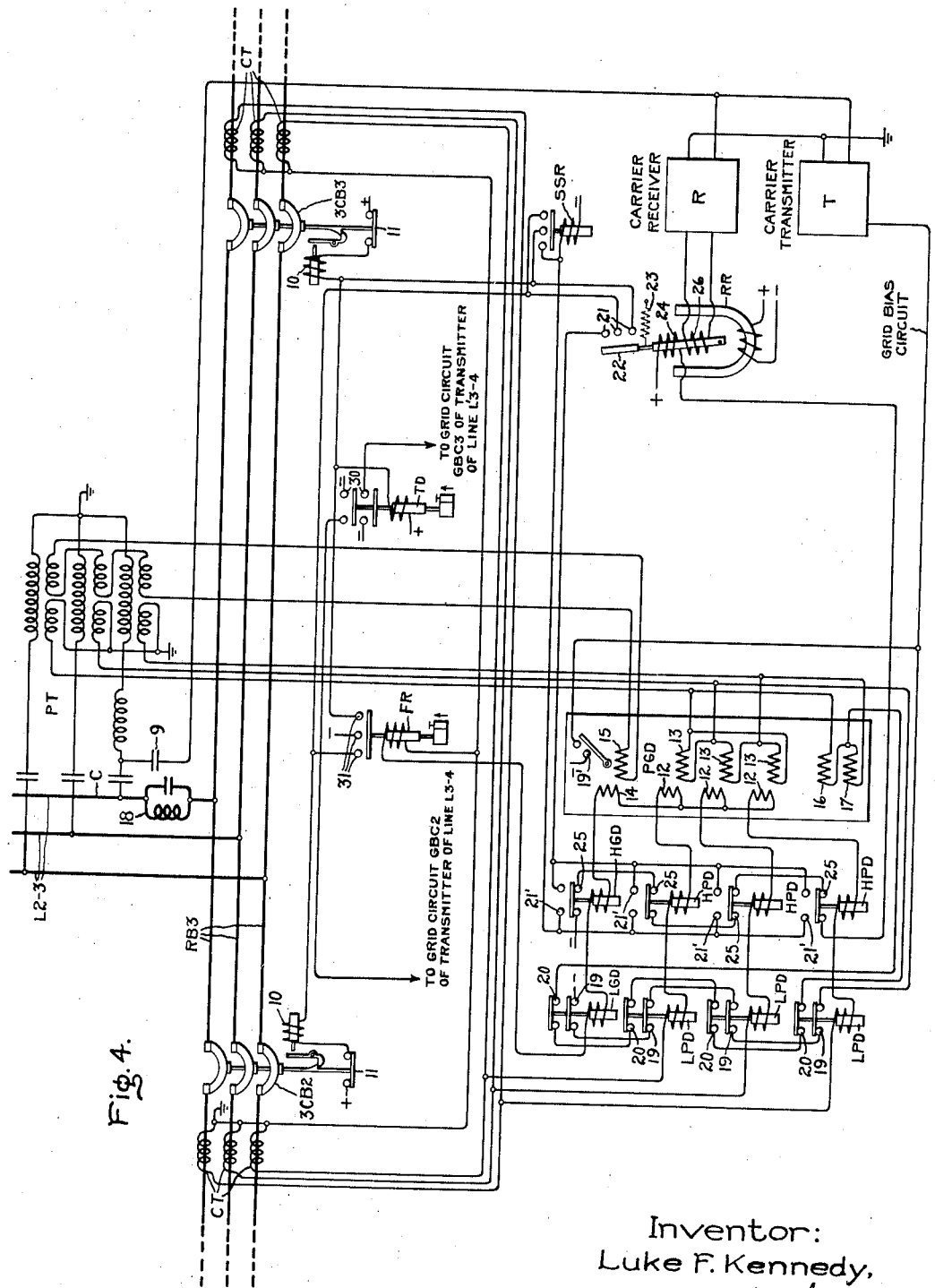

Patented Oct. 7, 1941

2,258,250

UNITED STATES PATENT OFFICE 2,258,250

PROTECTION OF ELECTRIC SYSTEMS

Luke F. Kennedy, Schenectady, N. Y., assignor to General Electric Company, a corporation of New York Application November 25, 1939, Serial No. 306,104

18 Claims. (Cl. 175—294)

My invention relates to improvements in the protection of electric systems and more particularly to improvements in the secondary or back-up protection of sectionalized electric power systems whereby to provide suitable protection in case of failure of the primary protection.

One object of my invention is to provide improved back-up protection such that, when the protective relays or circuit breakers or both of a section at fault fail to disconnect the section as they should, the protective equipment of another section or sections is rendered effective to disconnect the faulty section from the system with minimum loss in transmitting ability. Another object of my invention is to obtain this back-up protection without materially altering the protective apparatus of the other section and with a minimum of additional equipment of proven reliability. These and other objects of my invention will appear in more detail hereinafter.

In these days of high voltage long distance transmission and intersystem transfer of large amounts of electric energy, the desire for high sensitivity and speed of operation of protective relays and quick operation of circuit breakers, in order to maintain maximum continuity of service without damage to equipment, has resulted in a requirement for back-up protection comparable in quality to the primary protection so that failure of either the protective relays or circuit breakers or both of the primary protection cannot materially disturb service or result in injury to equipment. Obviously, where back-up protection is economically justifiable, the introduction of additional hazards and complications, which may lead to failures in the back-up protection, must be avoided.

According to my invention, in case of failure of the primary protection of one section of an electric power system, I so modify the primary protection of an adjacent section that disconnection of the faulty section from the rest of the system is accomplished through the primary protective equipment of the adjacent section with minimum disturbance to the system. Moreover, for this modification I use, in accordance with my invention, a minimum of protective equipment of proven reliability so as to minimize the hazards and maintain the cost on an economic basis. Further, in accordance with my invention, I provide back-up protection which is particularly adapted for use in protective arrangements of the type wherein a portion of an electric system is selectively controlled by an auxiliary control current which may be in the form of carrier current transmitted over the power circuit or any suitable control current transmitted over a separate circuit.

My invention will be better understood from the following description when considered in connection with the accompanying four sheets of drawings and its scope will be pointed out in the appended claims.

Figure 2:
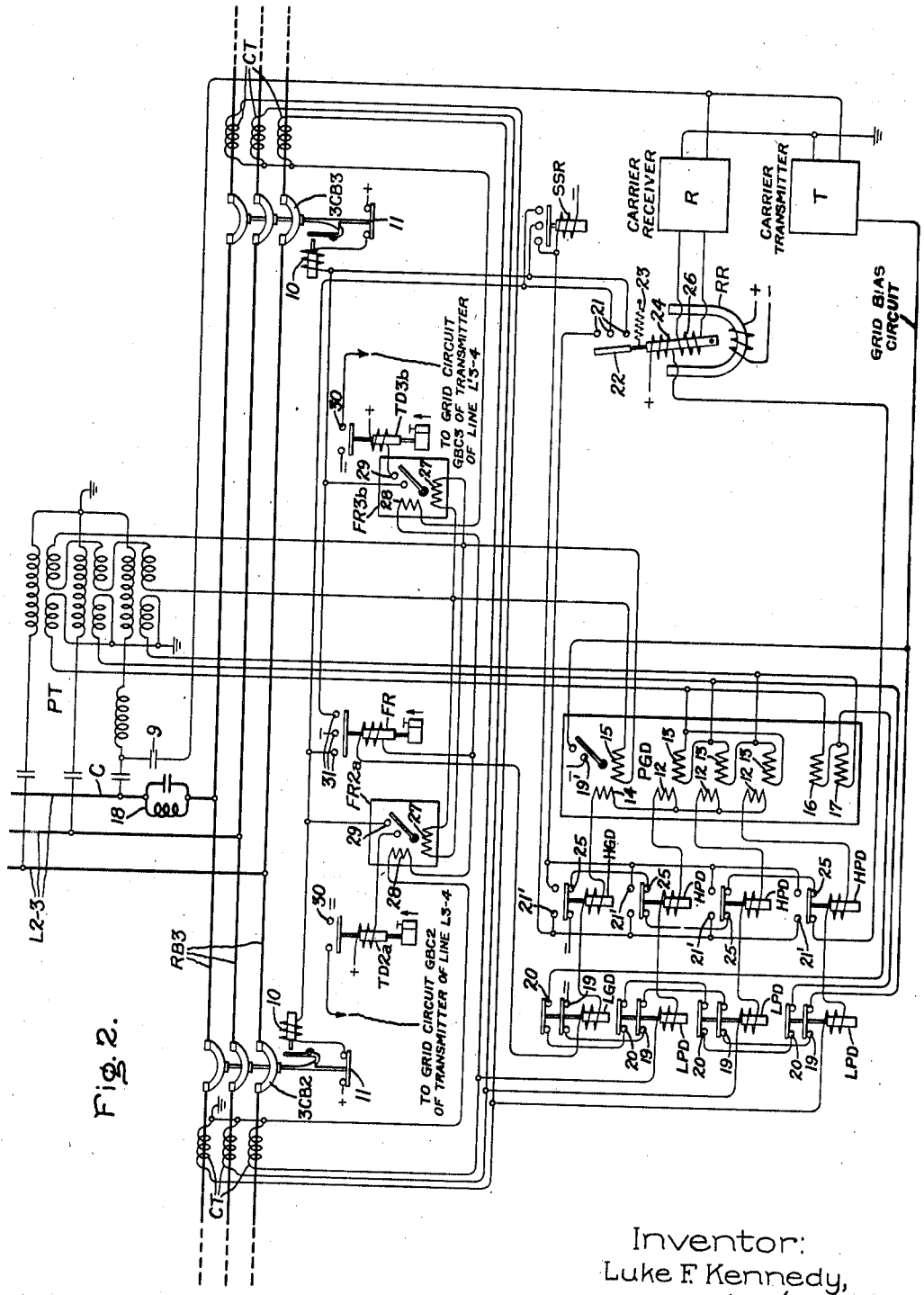
Figure 3:
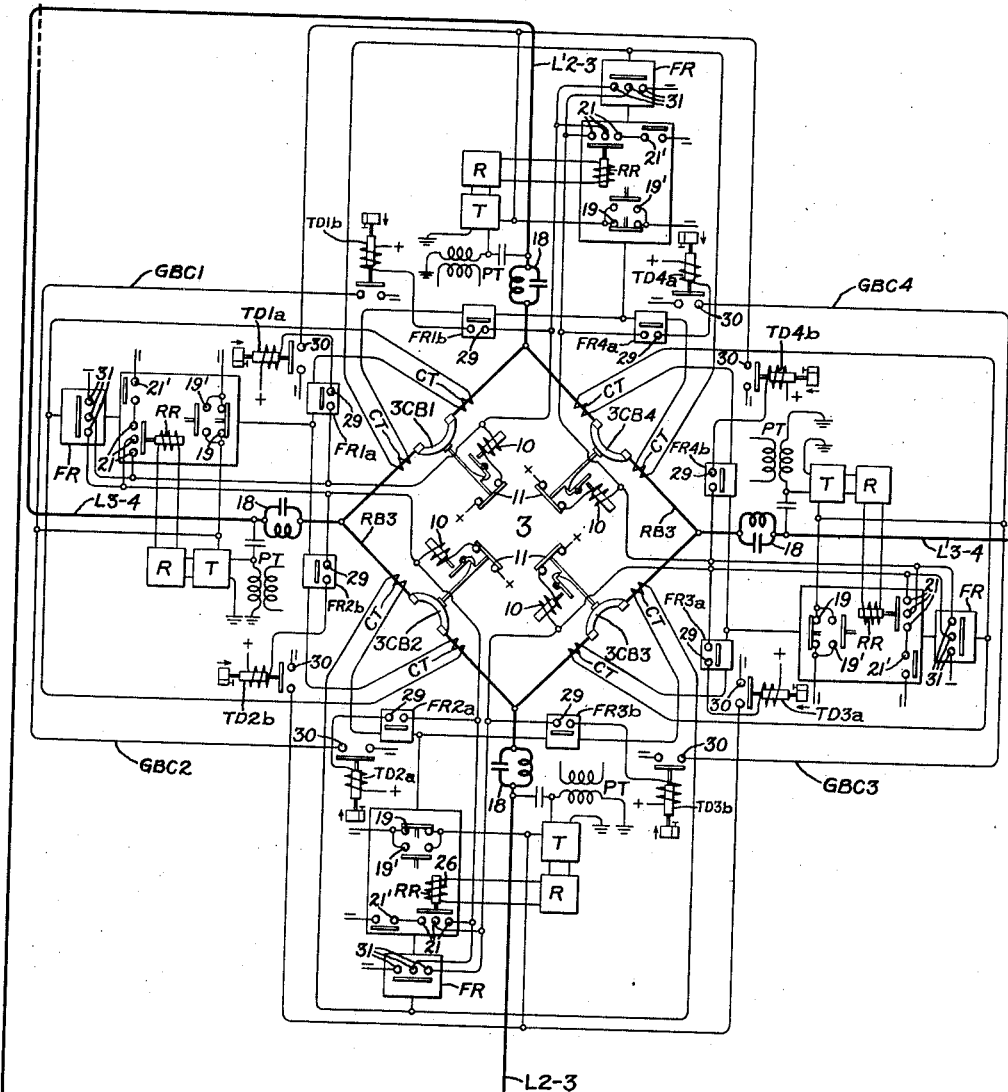

In the accompanying drawings, Fig. 1 illustrates schematically in single line diagram an existing high voltage sectionalized power system; Fig. 2 illustrates diagrammatically an embodiment of my invention in the protective equipment at the junction of a line section and a bus; Fig. 3 illustrates in a single line diagram for clearness the embodiment of my invention shown in Fig. 2 as applied to the ends of a plurality of groups of parallel lines connected to a ring bus at one station; and Fig. 4 illustrates diagrammatically, in the manner shown in Fig. 2, a modification of my invention.

Referring now to Fig. 1, the sectionalized electric power system shown schematically therein comprises a plurality of stations 1, 2, 3 and 4 respectively represented by ring busses RB1, RB2, RB3 and a double bus B4a, B4b. The ring bus RB1 is provided with sectionalizing circuit breakers 1CB1, 1CB2, 1CB3 and 1CB4. Similarly, the ring bus RB2 is provided with sectionalizing circuit breakers 2CB1, 2CB2, 2CB3 and 2CB4. Likewise, the ring bus RB3 is provided with sectionalizing circuit breakers 3CB1, 3CB2, 3CB3 and 3CB4. As shown, a generator G1 is connected through a step-up transformer T1 to the ring bus RB1 between the circuit breakers 1CB2 and 1CB3, and a generator G' is connected through a step-up transformer T' to the ring bus RB1 between the circuit breakers 1CB4 and 1CB1. The ring bus RB1 is connected to the ring bus RB2 by a plurality of parallel lines L1—2 and L'1—2. The connections of these lines to the respective busses are such that line L1—2 can be sectionalized or isolated by the circuit breakers 1CB1, 1CB2, 2CB1 and 2CB2 and line L'1—2 by the circuit breakers 1CB3, 1CB4, 2CB3 and 2CB4. The ring bus RB2 is connected to the ring bus RB3 by a plurality of parallel lines L2—3 and L'2—3. The connections of these lines to the respective busses are such that the line L2—3 can be sectionalized or isolated by the circuit breakers 2CB2, 2CB3, 3CB2 and 3CB3 and the line L'2—3 by the circuit breakers 2CB4, 2CB1, 3CB4 and 3CB1. The ring bus RB3 and the double bus B4a, B4b are connected by parallel lines L3—4 and L'3—4 through step-down autotransformers T4 and T'4, respectively. The line L3—4 at the station 4 is provided with circuit breakers 4CBa and 4CBb to disconnect it from the busses B4a and B4b, respectively. The line L'3—4 is provided with circuit breakers 4CBa' and 4CBb' to disconnect it from the busses B4a and B4b, respectively. The line L3—4 may be sectionalized or isolated by the circuit breakers 3CB1, 3CB2, 4CBa and 4CBb. The line L'3—4 may be sectionalized or isolated by the circuit breakers 3CB3, 3CB4, 4CBa' and 4CBb'. Each of the lines L1—2, L'1—2, L2—3, L'2—3, L3—4 and L'3—4 is shown with an intermediate dotted portion to give a concept of distance.

Thus with this arrangement it will be observed that any line can be isolated by the opening of the two circuit breakers adjacent the line in each of the busses to which the line is connected. It is customary to provide fault responsive devices including relays to isolate a line in this way. It will be observed, however, that, upon failure of any one of the four circuit breakers adjacent the ends of a line to open on the occurrence of a fault on the line, current may still be supplied to the fault through the circuit breaker remaining closed. In other words, if the primary protection of a line section fails, the fault is not cleared. It is, accordingly, desirable either to make another attempt to trip the circuit breaker, which has not opened, and, further, if this attempt fails, to eliminate other possibilities of infeed to the fault. Thus, assuming a fault as indicated by X on the line L2—3, the protective equipment associated with this line should open the circuit breakers 2CB2, 2CB3, 3CB2 and 3CB3 at stations 2 and 3 respectively. If for any reason a circuit breaker, for example, the circuit breaker 3CB3, should fail to open, then current may be fed to the fault through the circuit breaker 3CB4 and through the line L'3—4. Now, if a second attempt to open the circuit breaker 3CB3 fails, it is obvious that the circuit breakers 3CB4, 4CBa' and 4CBb' should be opened in order to prevent infeed to the fault through the circuit breaker 3CB3.

Fig. 2 illustrates diagrammatically protective equipment embodying my invention that may be applied to each junction of a line and a bus section in a system such as shown in Fig. 1 in order to obtain the maximum of back-up protection on an economically justifiable basis. For the purpose of more direct reference, it will be assumed that the equipment shown in Fig. 2 is at the junction of the line L2—3 with the ring bus RB3 at station 3. The circuit breakers 3CB2 and 3CB3 constitute a part of the primary protection of the line section L2—3. Each of these circuit breakers, as well as the others schematically illustrated in Fig. 1, may be of the latched closed type having a trip coil 10 and an a auxiliary switch 11.

Also, as shown, for this junction point of line L2—3 and bus RB3, the primary protection for the line L2—3, including the circuit breakers 3CB2 and 3CB3 at station 3, is of the high speed carrier pilot individual section type wherein selectivity is based on transmission of carrier for faults external to the section in question and no transmission of carrier when the fault is in the section. Similar equipment is, of course, installed at the station 2 end of line L2—3. If desired, such primary protection may be provided for each line. Examples of such protective arrangements are well known to the art. Accordingly, instead of going into detail in illustrating such a protective arrangement, I have shown in Figs. 2 and 3 only the fundamental features which are essential to an understanding of my invention wherein I so modify the primary protection of one section in the event of failure of the primary protection of another section on the occurrence of a fault thereon as to insure the isolation of the fault.

Thus, for example, in Fig. 2 I have illustrated in three-phase diagram the alternating current energizing circuits of low set phase fault detectors LPD, a low set ground fault detector LGD, high set phase fault detectors HPD, a high set ground fault detector HGD, and a combination polyphase and ground power directional relay PGD having a voltage restraint feature. By high and low set, I refer to the sensitivity of response of the respective fault detectors such that the low set responds first. The high and low set phase and ground fault detectors are illustrated simply as overcurrent relays. These phase and ground fault detectors are respectively so connected to current transformers CT in the bus RB3 as to be energized in accordance with the total current in the respective phase conductors of the line L2—3 and the ground current therein through the circuit breakers 3CB2 and 3CB3. Preferably the current transformers CT are connected on the side of the circuit breakers 3CB2 and 3CB3 away from the line L2—3. As will be obvious to those skilled in the art, the fault detectors may be other suitable types of relays which respond to faults, such for example as undervoltage relays or distance relays. The polyphase power element of the power directional relay PGD comprises three current-energized windings 12 which cooperate with three voltage-energized windings 13 to provide an effect dependent on the polyphase power in the line L2—3 at the end adjacent the bus RB3. The ground power element comprises a residual current-energized winding 14 which cooperates with a residual voltage-energized winding 15 to provide an effect dependent on the ground power flowing in the line L2—3 at the end adjacent the bus RB3. The voltage restraint feature is provided by cooperating voltage windings 16 and 17. Like the windings of the phase and ground fault detectors, the phase and residual current windings 12 and 14 of the polyphase and ground power directional relay elements are energized from the current transformers CT in accordance with the total current into or out of the respective phase conductors of the line L2—3 at the RB3 bus end and the ground current into or out of this line at this end. The desired voltages for the voltage windings 13, 15, 16 and 17 may be obtained from a polyphase bushing potential transformer device PT connected to the phase conductors of the line L2—3, as shown.

The carrier pilot protective equipment further includes a carrier transmitter and receiver which are simply illustrated in outline by squares T and R respectively since the details of this carrier equipment constitute no part of my invention and since suitable devices for the purpose are well known to the art, as shown for example in United States Letters Patent 1,930,333 and 2,137,865. The transmitter T and receiver R are coupled to a phase conductor C of the line L2—3 by suitable means indicated simply as a condenser 9. The phase conductor C is provided at each end with a suitable trap circuit 18 for confining the carrier to this conductor.

The operation of the carrier transmitter at any point is controlled locally, so as normally to prevent transmission, by the series-connected circuit-opening contacts 19 of the low set fault detectors which control the grid bias on the master oscillating tube, not shown, of the transmitter. Even though one of the low set fault detectors operates to tend to remove this bias, it may be maintained for power flow in a given direction, for example from the line to the bus, by the circuit-closing contacts 19' of the power directional relay PGD. The series-connected circuit-opening contacts 20 of the low set fault detectors LPD and LGD control the voltage restraint of the power directional relay PGD so as to remove this restraint on the occurrence of a fault.

For controlling the circuit of the trip coils 10 of the circuit breakers 3CB2 and 3CB3 so as to effect an energization thereof for a fault on the line L2—3, there is provided a receiver relay RR, which is illustrated as of the polarized directional type, and which has its contacts 21 arranged in series with the parallel-connected circuit-closing contacts 21' of the high set phase and ground fault detectors HPD and HGD. The receiver relay RR has its movable contact-controlling member 22 normally held in the circuit-opening position against the bias of a spring 23 by an energizing winding 24 under the control of the series-connected circuit-opening contacts 25 of the high set phase and ground fault detectors HPD and HGD.

In order to prevent a tripping action of the receiver relay RR in case of faults external to the line L2—3, it is provided with a further winding 26 for maintaining the circuit-controlling member 22 in the circuit-opening position in response to reception of carrier from either the local transmitter or the transmitter at the remote end of the line section. For this purpose the winding 26 is connected to receive the output of the associated carrier receiver R. There may also be provided a series seal-in relay SSR which takes over the circuit-controlling duties of the fault detector and receiver relay whereby, when once energized, to maintain the trip coil circuits definitely closed regardless of change in position of the contacts of the fault responsive relays. This seal-in relay also tends to eliminate any severe duty on the contacts of the fault responsive relays in connection with the tripping of the circuit breaker whose auxiliary switches 11 interrupt the trip coil circuits and also the seal-in circuit of the relay SSR.

In Fig. 3 I have shown in single line diagram the overall arrangement for the station 3 of the power system shown in Fig. 1, the ring bus RB3 being shown for the purpose of symmetry as a square in the center of the diagram. Moreover, in order further to simplify the diagram so as to aid in understanding my invention, the alternating current windings of the fault responsive relays LPD, LGD, HPD, LGD and PGD of the carrier pilot protection have been omitted and these relays shown only by such of their contacts 19, 19' and 21' as are necessary to a complete understanding of my invention. The illustration of the receiver relay RR has been simplified by omitting the normal biasing winding 24. Also the series seal-in relay SSR has been omitted.

In accordance with my invention, I so selectively modify or change, on the occurrence of a fault on one section for which the protective apparatus of this section fails properly to function, the protection of the section immediately connected to the faulty section through the circuit interrupting means which has failed to function, as to insure clearing the fault off the system with the minimum of loss of transmitting ability. Thus, in the illustrated embodiment of my invention shown in Figs. 2 and 3, I modify the protective equipment of a sound line, for example L'3—4 adjacent the faulty line L2—3, by removing that feature, which makes the protective equipment on the sound line L'3—4 selectively effective to prevent tripping, a predetermined time after the equipment of the faulty line has had an opportunity to function and fails so to do. Thus, for example, assuming a fault on the line L2—3, as indicated by X in Figs. 1 and 3, then the protective equipment associated with one or more sound lines L'3—4, etc., assuming carrier pilot protection as illustrated in Figs. 1 and 2, will function to transmit carrier to energize the biasing winding 26 of the receiver relays RR so as to maintain these relays in the non-tripping position. However, if the transmission of blocking current, such as carrier, on a sound line or system section is stopped, then tripping on this line will occur so as to isolate the fault.

One way to accomplish this, in accordance with my invention, with a discriminating action which will tend to disconnect the fewest sound system sections, is to associate with the end of a line one or more fault responsive directionally discriminating back-up protective relays. For example, there may be provided, as shown in Fig. 3, two of these back-up protective relays for each line end. Thus at the station 3 line L2—3 has relays FR2a and FR3b shown also in Fig. 2; line L'3—4 has relays FR3a and FR4b; line L'2—3 has relays FR4a and FR1b; and line L3—4 has relays FR1a and FR2b. These relays may be of the circuit-closing ground power-directional type with cooperating current and potential windings 27 and 28, respectively, shown only in Fig. 2. Thus, as shown in Fig. 2, the potential windings 27 of the relays FR2a and FR3b are connected to the potential transformer device PT in the line L2—3 to be energized in accordance with the residual voltage of the phase conductors of this line at its station 3 end. The current windings 28 are connected to be energized from the current transformers CT on the opposite sides of the circuit breakers 3CB2 and 3CB3 from the end of the line L2—3 in accordance with the residual or ground current flowing into the line L2—3 through the circuit breakers 3CB2 and 3CB3. The connections of the windings 27 and 28 of each relay FR2a and FR3b are such that, if there is a flow of ground fault power through the circuit breaker 3CB2 into the line L2—3, then the relay FR2a will close its contacts 29. If there is a flow of ground fault power through the circuit breaker 3CB3 into the line L2—3, the relay FR3b will close its contacts 29.

By analogy, it will be obvious from Figs. 1 and 3 how the remaining fault responsive relays FR3a and FR4b associated with line L'3—4, FR4a and FR1b associated with line L'2—3, and FR1a and FR2b associated with line L3—4 operate in response to faults on these respective lines, resulting in ground fault power flow into the line through the circuit breaker with which the relay is associated. Thus to cite another example, if there should occur a flow of ground fault power into the line L'3—4 through the circuit breaker 3CB4, then the corresponding ground power directional relay FR4b should operate to close its contacts 29, but if the flow of ground fault power should occur through the circuit 3CB3, then the corresponding ground power directional relay FR3a should operate to close its contacts.

The contacts 29 of each of these discriminating fault responsive relays FR1a, FR2b, FR2a, etc. are connected in series with the contacts of the receiver relay RR and the parallel connected contacts 21' of the high set fault detectors HPD and HGD associated with the perpendicular line end to control the circuit of an auxiliary time delay relay. Thus at station 3 fault responsive relays FR2a and FR3b, associated with the line L2—3, control time delay relays TD2a and TD3b, respectively; fault responsive relays FR3a and FR4b control time delay relays TD3a and TD4b, respectively; fault responsive relays FR4a and FR1b control time delay relays TD4a and TD1b, respectively; and fault responsive relays FR1a and FR2b control time delay relays TD1a and TD2b, respectively.

If, on the occurrence of a fault on the line L2—3, as indicated by X in Figs. 1 and 3, the fault responsive relays LPD, LGD, HPD, HGD and PGD of the primary protection of this line function properly to try to trip the circuit breakers 3CB2 and 3CB3 and one of these circuit breakers fails to open, for example 3CB3, then, since at least one of the pairs of contacts 21' of the high set fault detectors is closed and the contacts 21 of the receiver relay RR are closed and there is a flow of fault power into the line L2—3 through the circuit breaker 3CB3, the relay FR3b will close its contacts to complete the circuit of the auxiliary time delay relay TD3a. This relay will close its contacts 30 after a predetermined time. Further, in accordance with my invention, the closing of these contacts 30 is arranged to stop the transmission of blocking carrier in the nearest sound line to the circuit breaker 3CB3 but on the opposite side thereof from the line L2—3 at fault. Thus the contacts 30 of the time delay relay TD3a may be connected in series in a grid biasing circuit GBC3 of the transmitter T associated with the primary protection of the line L'3—4 so as to apply a negative bias to the transmitter T associated with the line L'3—4 whereupon transmission of carrier over this line ceases.

With the cessation of carrier on line L'3—4, an attempt to trip the circuit breakers 3CB3 and 3CB4 at station 3 and 4CBa' and 4CBb' at station 4 by the primary protective equipment associated with this section will follow since the biasing winding 26 of the receiver relay RR associated with the primary protection at the ends of this section will no longer be energized, and the contacts 21' of at least one of the high set fault detectors are closed. In other words, as will be obvious from Fig. 3, since the contacts 21' of at least one of the high set fault detectors are closed and the contacts 21 of the receiver relay RR, associated with the line L'3—4, are closed because of stoppage of transmission of carrier over this line, the circuits of the trip coils 10 of the circuit breakers 3CB3 and 3CB4 are completed.

Even though some one or more of the fault responsive directional relays, like FR1a, FR2b, FR2a, etc. of station 3 at other stations may operate to close their contacts, because of flow of ground fault current to the fault through the circuit breaker with which they are associated, the associated time delay relay, which such relays control, will not thereby be energized to cause blocking of transmission because the receiver relays RR, associated with the sound sections, are kept energized by transmission of carrier. There is, accordingly, no tendency for cascade tripping of sound sections. However, if the primary protection of a faulty section fails only in the circuit breakers themselves and the back-up protection for this faulty section should also fail only in the circuit breakers with the result that the adjacent sound section or sections are not disconnected to isolate the fault, then, since the receiver relays in such adjacent sound sections have been deenergized in consequence of the stoppage of carrier and since the fault detectors of these sound sections are energized, the back-up protection will be extended to other sound sections in cascade formation. However, it is quite unlikely that the back-up protection will have to extend beyond the first adjacent sound section, but, if such extension is necessary, protective equipment embodying my invention provides for it.

If the discriminating action afforded by the directionally responsive relays FR2a, FR3b, FR3a, etc., is not necessary, then, in case of failure of the protective apparatus of the faulty section properly to function, one time delay relay TD per bus section, as shown in Fig. 4, is sufficient to disconnect the section, which is connected to the faulty section through the circuit breaker which has failed to function, and also the circuit breaker in the bus section on the other side of the faulty section from the breaker which failed to operate. However, in this case the discriminating action will be lost because, since the time delay relay TD is not selective as to direction of feed to the fault, both line sections adjacent to the faulty section will be disconnected from the bus. Thus the time delay relay TD may be arranged to control two grid biasing circuits of the transmitters T of the lines connected to the bus on each side of the line in question so that, in the event of failure, for example, of the primary protection of the line L2—3 in case of a fault thereon, both lines L3—4 and L'3—4 would be disconnected. This, of course, would be undesirable if there were only two parallel lines L3—4 and L'3—4 between stations 3 and 4 since station 4 would be without power unless the system had other power sources than those shown in Fig. 1. Of course, if there were three lines between stations 3 and 4, the discriminating action afforded by the addition of the directionally responsive relays FR2a, FR3b, FR3a, etc., is not as necessary as in the case of only two connecting lines. However, in general, this discriminating action is preferable since it insures the least disturbance to the system as a whole in case of a fault on one section. Even though this protective equipment fails to open the circuit breaker 3CB3, which was assumed to be the cause of failure to disconnect the section line L2—3, it should effect the opening of circuit breakers 3CB4, 4CBa' and 4CBb', associated with line L'3—4, so as to prevent further flow of power into the line L2—3 through the defective breaker 3CB3.

In the event of failure of the protective relays associated with one end of a line, I provide means for trying to disconnect not only this line through its own circuit breakers at the end of a section but also to modify the protection of the line connected thereto through the circuit breakers controlled by the relays which failed to operate whereby to make doubly certain that the fault will be isolated a predetermined time after the apparatus on the faulty line has had an opportunity to function and failed so to do. This may be accomplished by a suitable fault responsive relay, such as a time delay circuit-closing ground current relay FR, which is connected to the current transformers CT in the respective bus section in a manner similar to the low and high set ground fault detectors LGD and HGD, respectively, to respond to current flow above a predetermined value in the line through the circuit breakers connecting the line to the bus section in question. Thus, as shown for the bus section to which the line L2—3 is connected, the relay FR has contacts 31 which are arranged in series in the circuits of the trip coils 10 of the circuit breakers 3CB2 and 3CB3 so as to make an attempt to trip these breakers. The contacts 31 are further connected in series with the contacts of the ground fault power directional relays FR2a and FR3b so that, in the event of failure of the circuit breaker 3CB2 or 3CB3 or both to open, one or both of the auxiliary time delay relays TD2a, TD3b will be energized and at the expiration of its time delay close its contacts 30 to complete the grid bias circuit GBC2 or GBC3 or both of the transmitter T of the carrier protective equipment in the adjacent lines L3—4, L'3—4 on the same bus whereby to try to effect the disconnection of one or both of these lines through their own protective equipment in the manner heretofore described. In the power system illustrated the time delay of the fault responsive relays FR should exceed the time delay of the relays TD2a, TD3b, etc., of Figs. 2 and 3 and TD of Fig. 4 by an amount sufficient to allow for the functioning of these relays and the apparatus which they control.

Wherever there is a flow of fault current through the circuit breakers at the end of a bus section with multiple feed to the fault, then the overcurrent fault responsive relay FR, associated with this bus section, will tend to operate to trip the circuit breakers of the associated bus section. However, in a power system, such that there may occur multiple feed to a fault, the more remote the bus section is from the fault, the less the fault current flowing through this section will be. Accordingly, the fault responsive relays FR preferably should have a discriminating action to avoid unnecessary tripping of the sound section. Thus, for example, the fault responsive relays FR may be of the type known to the art as inverse time limit relays. Such relays, as is well known, have a response time which is inversely proportional to the magnitude of the electric quantity which energizes the relays. With this arrangement the fault responsive relay nearest the fault and receiving the most fault current, accordingly, operates the quickest. Of course, other discriminating relays may be used without departing from the scope of my invention, the only essential being that the back-up protection should not unnecessarily disconnect a sound line section.

Thus it will be observed that, if one of the circuit breakers in a bus section between which a faulty line is connected fails to open, the primary protective equipment in the line connected directly to the faulty section through the failing circuit breaker will be brought into action to try to separate the fault from the rest of the system.

While I have shown ground fault responsive relays for effecting the modification of the primary protection of an adjacent sound section, it will be obvious to those skilled in the art that phase fault responsive protective relays may also be employed with the ground fault protective relays, or alone, depending upon the fault protection desired. Thus, if the majority of faults are ground faults, as is frequently the case in systems of the type under discussion, back-up protection for phase faults may not be economically justifiable. On the other hand, there is no reason why back-up protection may not be provided for both phase faults and ground faults if the system requires both. The back-up fault responsive relays FR2a, FR3b, FR3a, etc., which respond to the flow of fault power or current into the line from the bus section to which the line in question is connected, are necessary only for selective action between two adjacent lines L3—4 and L'3—4 so that both do not have to be disconnected from the bus unless both the circuit breakers 3CB2 and 3CB3 fail to open for a fault on L2—3, for example. In other words, the fault responsive relays FR2a, FR3b, FR3a, etc., are directionally responsive for additional discrimination.

Although the primary protection is illustrated as of the carrier pilot type, my invention is not limited to this particular type of protection or to any type of protection in which selective action is obtained by an auxiliary control current regardless of the circuit over which this control current is transmitted. In brief, the fundamental concept of my invention embodies means for so modifying or changing the primary protection of one section of an electric power system, on the occurrence of a fault on another section thereof as to eliminate the selective feature of the primary protection in the first section after the primary protection of the section at fault has failed to function whereby to insure isolation of the fault from the system.

While I have shown and described my invention in considerable detail, I do not desire to be limited to the exact arrangement shown, but seek to cover in the appended claims all those modifications that fall within the true spirit and scope of my invention.

What I claim as new and desire to secure by Letters Patent of the United States is:

1. In a protective arrangement for a sectionalized electric power system, fault responsive means for isolating one section from the system on the occurrence of a fault thereon, means normally responsive to faults only on another section of the system for selectively isolating said other section from the system on the occurrence of a fault thereon, and means responsive to the direction of flow of fault current between said sections upon failure of the fault responsive means associated with said one section to isolate said section on the occurrence of a fault thereon for temporarily changing the response of the fault responsive means associated with said other section whereby to effect the separation of said other section from the system.

2. In a protective arrangement for a sectionalized electric power system, fault responsive means for disconnecting one section from another section on the occurrence of a fault on said one section, fault responsive means for selectively isolating said other section from all the other sections on the occurrence of a fault on said other section, and means responsive to the direction of flow of fault current between said sections upon failure of the fault responsive means associated with said one section to disconnect said one section on the occurrence of a fault thereon for temporarily eliminating the selectivity of the fault responsive means associated with said other section whereby to effect the disconnection of said other section from the system.

3. In a protective arrangement for a sectionalized electric power system, fault responsive means for disconnecting one section from another section on the occurrence of a fault on said one section, means normally responsive to faults only on another section of the system for selectively disconnecting said other section from the system on the occurrence of a fault thereon, and means responsive to the direction of flow of fault current between said sections upon failure of the fault responsive means associated with said one section to disconnect said section from the other section on the occurrence of a fault thereon for temporarily changing the response of the fault responsive means associated with said other section whereby to effect the disconnection of said other section from the rest of the system.

4. In a protective arrangement for a sectionalized electric power system, fault responsive means for disconnecting one section from another section on the occurrence of a fault on said one section, fault responsive means for selectively isolating said other section on the occurrence of a fault thereon comprising means for transmitting a control current to prevent isolation of said other section on a fault external thereto, and means responsive to the direction of flow of fault current between said sections upon failure of the fault responsive means associated with said one section to isolate said section on the occurrence of a fault thereon for temporarily stopping the transmission of said control current whereby to permit the operation of the fault responsive means associated with said other section.

5. In a protective arrangement for a sectionalized electric power system, fault responsive means for disconnecting one section from another section on the occurrence of a fault on said one section, fault responsive means for selectively disconnecting said other section from the system on the occurrence of a fault thereon comprising an auxiliary control current circuit whose state of energization controls the selectivity of the fault responsive means, and means responsive to the direction of flow of fault current between said sections for a predetermined time after the occurrence of a fault on said one section due to failure of the fault responsive means associated therewith to disconnect said section for temporarily changing the state of energization of said control current circuit whereby to effect the disconnection of said other section from the rest of the system.

6. In a protective arrangement for a sectionalized electric power system, fault responsive means for disconnecting one section from another section on the occurrence of a fault on said one section, fault responsive means for selectively disconnecting said other section from the system on the occurrence of a fault thereon, and means operative in response to the direction of flow of fault current between said sections for a predetermined time after failure of the fault responsive means associated with said one section to disconnect said section in case of a fault thereon for temporarily eliminating the selectivity of the fault responsive means associated with said other section whereby to effect the disconnection of said other section from the rest of the system.

7. In a protective arrangement for a sectionalized electric power system, first circuit interrupting means for disconnecting one section from another section, a first fault responsive means operative in response to abnormal conditions on said one section for effecting a circuit interrupting operation of said first circuit interrupting means, second circuit interrupting means for disconnecting said other section from the rest of the system, a second fault responsive means normally responsive to effect a circuit interrupting operation of said second circuit interrupting means only on the occurrence of abnormal conditions on said other section, and means responsive to a flow of current from said other section to said one section on the occurrence of a fault thereon for a predetermined time after failure of said first circuit interrupting means to disconnect said sections for rendering said second fault responsive means operative to effect a circuit interrupting operation of said second circuit interrupting means.

8. In a protective arrangement for a sectionalized electric power system, first circuit interrupting means for disconnecting one section from another section, a first fault responsive means operative in response to abnormal conditions on said one section for effecting a circuit interrupting operation of said first circuit interrupting means, second circuit interrupting means for disconnecting said other section from the rest of the system, a second fault responsive means normally responsive to effect a circuit interrupting operation of said second circuit interrupting means only on the occurrence of abnormal conditions on said other section, and means responsive to the magnitude and direction of flow of current between said sections on the occurrence of a fault on said one section for a predetermined time after failure of said first fault responsive means to function for rendering said second fault responsive means operative to effect a circuit interrupting operation of said second circuit interrupting means.

9. In a protective arrangement for a sectionalized electric power system, first circuit interrupting means for disconnecting one section from another section, a first fault responsive means operative in response to abnormal conditions on said one section to effect a circuit interrupting operation of said first circuit interrupting means, second circuit interrupting means for disconnecting said other section from the rest of the system, a second fault responsive means associated with said other section and comprising means for transmitting an auxiliary control current to block the operation of said second circuit interrupting means on the occurrence of a fault elsewhere than on said other section, and means responsive to a flow of current from said other section to said one section on the occurrence of a fault thereon for a predetermined time after failure of said first circuit interrupting means to disconnect said sections for eliminating the blocking action of said transmitted control current whereby to permit a circuit interrupting operation of said second circuit interrupting means.

10. In a protective arrangement for a sectionalized electric power system, first circuit interrupting means for disconnecting one section from another section, a first fault responsive means operative in response to abnormal conditions on said one section for effecting a circuit interrupting operation of said first circuit interrupting means, second circuit interrupting means for disconnecting said other section from the rest of the system, a second fault responsive means normally responsive to effect a circuit interrupting operation of said second circuit interrupting means only on the occurrence of abnormal conditions on said other section, directionally responsive means operative on the occurrence of a flow of current from said other section to said one section on the occurrence of a fault thereon for a predetermined time after failure of said first circuit interrupting means to disconnect said sections for rendering said second fault responsive means operative to effect a circuit interrupting of said second circuit interrupting means, and means cooperating with said directionally responsive means and operative therewith to effect a circuit interrupting operation of said second circuit interrupting means in response to a flow of current above a predetermined value for a predetermined time from said other section to said one section on the occurrence of a fault thereon after failure of said first fault responsive means to operate.

11. In a protective arrangement for a sectionalized electric power system, first circuit interrupting means for disconnecting one section from another section, a first fault responsive means operative in response to abnormal conditions on said one section for effecting a circuit interrupting operation of said first circuit interrupting means, second circuit interrupting means for disconnecting said other section from the rest of the system, a second fault responsive means normally responsive to effect a circuit interrupting operation of said second circuit interrupting means only on the occurrence of abnormal conditions on said other section, and means controlled by said first fault responsive means and operative with a time delay after the response thereof to attempt a circuit interrupting operation of said second circuit interrupting means in case of failure of said first circuit interrupting means to open in response to the operation of said first fault responsive means.

12. In a protective arrangement for a sectionalized electric power system, first circuit interrupting means for disconnecting one section from another section, a first fault responsive means operative in response to abnormal conditions on said one section for effecting a circuit interrupting operation of said first circuit interrupting means, second circuit interrupting means for disconnecting said other section from the rest of the system, a second fault responsive means normally responsive to effect a circuit interrupting operation of said second circuit interrupting means only on the occurrence of abnormal conditions on said other section, directionally responsive means operative on the occurrence of a flow of current from said other section to said one section on the occurrence of a fault thereon, and time delay means controlled by said directionally responsive means and said first fault responsive means and operative with a time delay after the joint response of said first fault responsive means and said directionally responsive means for effecting a circuit interrupting operation of said second circuit interrupting means in case of failure of said first circuit interrupting means to open in response to the operation of said first fault responsive means.

13. In a protective arrangement for a sectionalized electric power system, first circuit interrupting means for disconnecting one section from another section, a first fault responsive means operative in response to abnormal conditions on said one section for effecting a circuit interrupting operation of said first circuit interrupting means, second circuit interrupting means for disconnecting said other section from the rest of the system, a second fault responsive means normally responsive to effect a circuit interrupting operation of said second circuit interrupting means only on the occurrence of abnormal conditions on said other section, directionally responsive means operative on the occurrence of a flow of current from said one section to said other section on the occurrence of a fault thereon, time delay fault responsive means operative in dependence on the flow of current of a predetermined value for a predetermined time from said other section to said one section, and time delay means jointly controlled by said directional means and said time delay current means for effecting a circuit interrupting operation of said second circuit interrupting means a predetermined time after the occurrence of a fault on said first section and the failure of said first circuit interrupting means to disconnect said section.

14. In a protective arrangement for an electric power system having a plurality of sections connected together by circuit interrupting means at each end of each section, means responsive to the relative directions of the power flow at the ends of each section when a fault occurs on said system for selectively opening the circuit interrupting means at both ends of the faulty section, and means for selectively opening the circuit interrupting means at both ends of any section which is directly connected to a faulty section a predetermined time after a fault occurs.

15. In a protective arrangement for an electric power system having a plurality of sections connected together by circuit interrupting means, individual fault responsive means for each section for effecting the opening of the associated circuit interrupting means including means responsive to the relative directions of power flow at the ends of each section for rendering the individual fault responsive means of the associated section inoperative to effect the opening of the circuit interrupting means which connect the associated section to the rest of the system if the fault is outside the section, and means individual to each section for modifying the effect of the power directional responsive means on the fault responsive means of any other section which remains connected to a faulty section a predetermined time after a fault occurs whereby the circuit interrupting means connecting such other section to the system are opened.

16. In a protective arrangement for an electric power system having a plurality of sections connected together by circuit interrupting means, individual fault responsive means for each section normally operative to effect the opening of the circuit interrupting means at the ends of the associated section when a fault occurs on said system, control means individual to each section and dependent upon predetermined electrical conditions in the associated section for rendering the associated individual fault responsive means inoperative to effect the opening of the circuit interrupting means at the ends of the associated section when the fault is outside the associated section, and means for rendering the control means of any adjacent section which remains connected to a faulty section a predetermined time after a fault occurs inoperative to prevent the opening of the circuit interrupting means of the associated section by the associated fault responsive means.

17. In a protective arrangement for a sectionalized electric power system, fault responsive means for disconnecting one section from another section on the occurrence of a fault on said one section, fault responsive means for selectively disconnecting said other section from the system on the occurrence of a fault thereon comprising an auxiliary control current circuit the energization of which controls the selectivity of the fault responsive means, and means for effecting the energization of said control current circuit to prevent disconnection of said other section of the system when there is no fault thereon, and means responsive to the flow of fault current between said sections for a predetermined time after the occurrence of a fault on said one section due to failure of the fault responsive means associated therewith to disconnect said section for temporarily preventing the energization of said control circuit whereby to effect the disconnection of said other section from the rest of the system.

18. In a protective arrangement for an electric power system comprising a ring bus having a plurality of sections interconnected by circuit breakers, a first power line section having one end connected to one section of said bus and a second power line section having one end connected to another section of said bus, means responsive to faults on said first power line section for effecting a circuit opening operation of the particular bus circuit breakers adjacent said end of said first power line section, means responsive to faults on said second power line section for disconnecting the section from the system only on the occurrence of a fault thereon including one of said particular bus circuit breakers, and means responsive to the flow of fault current between said power line sections upon failure of the particular bus circuit breaker between the ends of said power line sections to open on the occurrence of a fault on said first power line section for opening another one of said bus circuit breakers and disconnecting said second power line section from the system at another point.

LUKE F. KENNEDY.